W. & W. S. Gillett.

Mop Wringer.

No. 2,658. Reissued June 25, 1867.

Witnesses:

L. Sinclair

S. S. Schuestock

Inventors:

W. Gillett

W. S. Gillett

By their Atty

J. Franklin Reigart

N. PETERS, PHOTO-LITHOGRAPHER, WASHINGTON, D. C.

UNITED STATES PATENT OFFICE.

W. GILLETT AND W. S. GILLETT, OF STOWE, VERMONT.

IMPROVED MOP-WRINGER.

Specification forming part of Letters Patent No. 59,586, dated November 13, 1866; Reissue No. 2,658, dated June 25, 1867.

*To all whom it may concern:*

Be it known that we, W. GILLETT and W. S. GILLETT, of Stowe, in the county of Lamoille and State of Vermont, have invented a new and Improved Wringer for Wringing Mops and other Articles; and we hereby declare the following to be a full, clear, and exact description of the same, reference being had to the accompanying drawings, in which—

Figure 1:
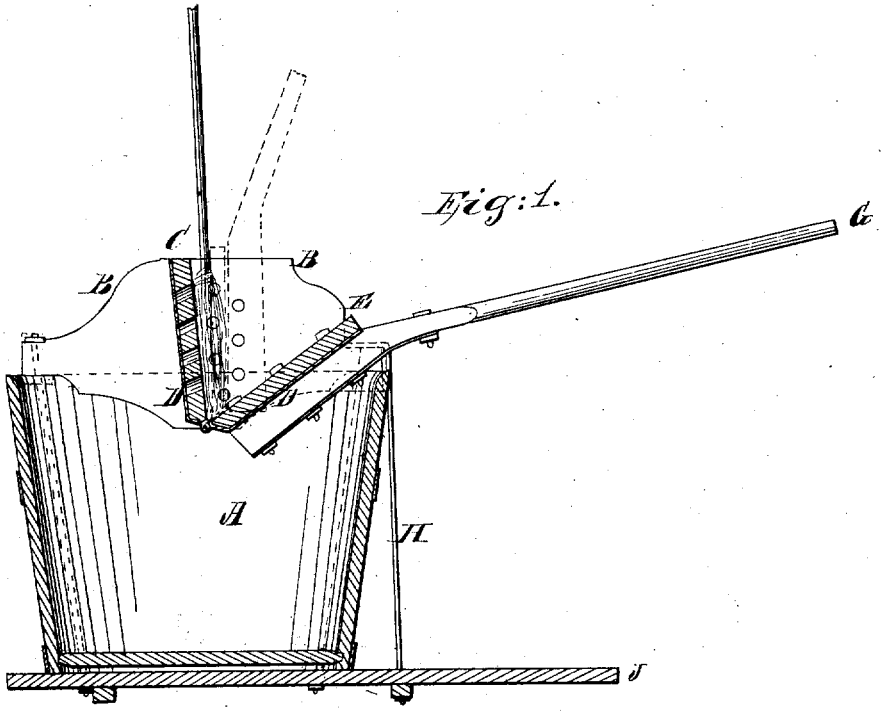
Figure 2:
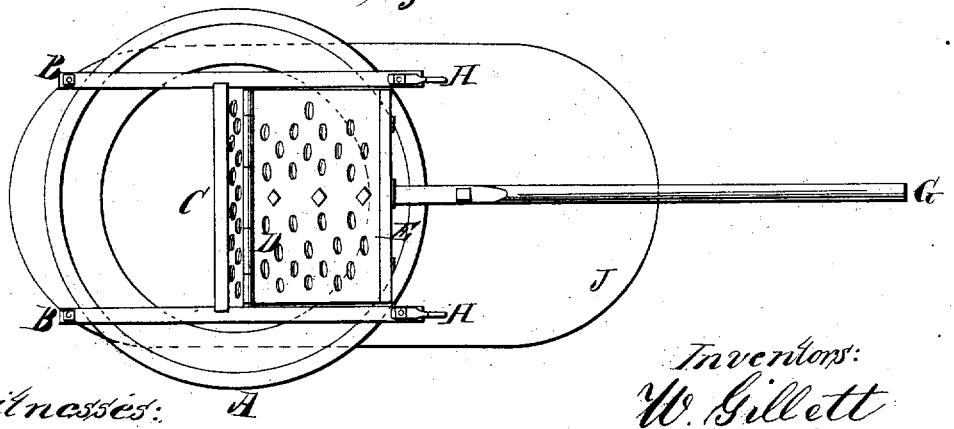

Figure 1 is a vertical central section of the wringer, and Fig. 2 is a top view or plan of the same.

The object of our invention is to obviate the necessity of wringing mops and other like articles with the hands, and thus save the excessive labor which usually attends the operation.

To this end our invention principally consists in forming a mop-wringer of two plates, which, whether perforated or not, are hinged together, and operated by means of a handle attached to one of the plates or by other suitable means, to squeeze and express the water from the mop or other article placed between them.

Our invention further consists in the combination and arrangement of the plates with a frame or braces for holding the same in position, and in the means employed both for securing the mop-wringer to the tub or bucket with which it is used, and for steadying the tub while the wringer is being operated.

To enable others to understand and use our invention, we will proceed to describe the manner in which the same is or may be carried into effect by reference to the accompanying drawings.

The wringer is composed of two plates, C E, united by hinges D. As shown in the drawings, the plates are perforated, so as to facilitate the escape of the water from the mop; but they may also be made without perforations, if desired.

The wringer is mounted or secured in a frame or between side boards of any suitable size and dimensions. The frame represented in the drawings consists of two side pieces, B, between which one of the plates, C, is held firmly, so as to be stationary with respect to the other plate, E, which is movable, being operated by a handle, G, or by other suitable means.

The wringer may be used with a tub or bucket or other vessel, A, by placing the frame or side boards, B, or other means for supporting the wringer, upon top of the vessel, as shown in Fig. 2, and then securing them to the vessel by means of braces, stay-rods, or other equivalent devices. When the side boards, B, are used, stay-rods H may extend from the ends of the boards, and then be secured either under the bottom of the tub or to a foot-board, J, upon which the operator stands, so as to steady the tub, and prevent its movement when the wringer is being used.

It will be readily seen, and without further explanation, that when the mop is placed between the two plates, the operator, standing upon the foot-board, is enabled to squeeze or wring the mop by simply pressing upon the lever G, thus saving the severe labor that is undergone when wringing the mop with the hands.

Having described our invention and the manner in which the same is or may be carried into effect, what we claim, and desire to secure by Letters Patent, is—

1. As a new article of manufacture, a mop-wringer composed of two plates hinged together, substantially as described, for operation, as set forth.

2. In a mop-wringer composed of two plates, making one of them stationary and connecting the other with it by a hinge-joint or its equivalent, substantially as set forth.

3. The combination, with the stationary and movable plates, of side boards or a frame, to which the stationary plate is permanently secured, substantially as described.

4. In combination with a mop-wringer constructed for operation substantially as described, the braces or their mechanical equivalents, whereby the said wringer is or may be secured to a tub or other vessel.

5. The combination, with a mop-wringer such as described, of a foot-board for steadying the tub while the wringer is being operated, said wringer and foot-board being secured to the tub by braces, substantially as specified.

6. In a mop-wringer such as described, forming apertures in the plates for the ready expulsion from between the plates of the liquid expressed from the mop.

7. In a mop-wringer such as described, providing one of the plates with a handle to move it to and from the stationary plate, as and for the purposes set forth.

In testimony whereof we have signed our names to this specification before two subscribing witnesses.

W. GILLETT.
W. S. GILLETT.

Witnesses:
J. H. BENNETT,
L. S. BENNETT.